(12) United States Patent
Inoue

(10) Patent No.: US 6,773,212 B2
(45) Date of Patent: Aug. 10, 2004

(54) CUTTING-OIL COATER AND CUTTING DEVICE

(75) Inventor: Tsutomu Inoue, Aichi (JP)

(73) Assignee: Fuji Koeki Co., Ltd., Aichi (JP)

( * ) Notice: Subject to any disclaimer, the term of this patent is extended or adjusted under 35 U.S.C. 154(b) by 184 days.

(21) Appl. No.: 10/014,628

(22) Filed: Oct. 22, 2001

(65) Prior Publication Data

US 2002/0061236 A1 May 23, 2002

(30) Foreign Application Priority Data

Oct. 26, 2000 (JP) ....................................... 2000-327233

(51) Int. Cl.$^7$ ................................................. B23C 5/28
(52) U.S. Cl. ..................... 409/136; 409/135; 408/56; 408/57; 184/55.1; 239/423
(58) Field of Search ................ 409/136, 135; 408/56, 57; 184/49, 50, 54, 55.1, 55.2, 57, 58, 59, 60, 6.26; 239/423, 419.5, 424.5, 463

(56) References Cited

U.S. PATENT DOCUMENTS

| | | | |
|---|---|---|---|
| 954,451 A | | 4/1910 | Merrell |
| 992,503 A | | 5/1911 | Howard |
| 1,333,451 A | | 3/1920 | Sample |
| 2,020,325 A | | 11/1935 | Myhren et al. |
| 2,245,601 A | | 6/1941 | Medsker |
| 2,438,868 A | | 3/1948 | Trier |
| 2,613,067 A | | 10/1952 | Goodyer |
| 2,653,517 A | * | 9/1953 | Pigott ........................ 409/132 |
| 2,719,604 A | | 10/1955 | Allen |
| 2,981,526 A | | 4/1961 | Grumbach |
| 3,240,243 A | | 3/1966 | Golick |
| 3,249,553 A | | 5/1966 | Steinberg |
| 3,439,777 A | | 4/1969 | Gothberg |
| 3,491,855 A | | 1/1970 | Obergefell et al. |
| 3,618,709 A | | 11/1971 | Boelkins |
| 3,729,898 A | | 5/1973 | Richardson |
| 3,744,771 A | | 7/1973 | Deaton |
| 3,756,348 A | | 9/1973 | Iizumi |
| 3,939,944 A | | 2/1976 | Mitchell et al. |
| 3,941,355 A | | 3/1976 | Simpson |
| 4,054,622 A | | 10/1977 | Lester |
| 4,131,658 A | | 12/1978 | Hirata et al. |
| 4,309,456 A | | 1/1982 | Lock |
| 4,335,804 A | | 6/1982 | Bardin et al. |
| 4,421,798 A | | 12/1983 | Lin |
| 4,541,966 A | | 9/1985 | Smith |
| 4,637,493 A | | 1/1987 | Ehlert |
| 4,802,555 A | | 2/1989 | Matsunaga et al. |
| 5,297,657 A | * | 3/1994 | McConkey ................ 184/6.14 |
| 5,427,203 A | | 6/1995 | Anspach, Jr. et al. |
| 5,462,656 A | | 10/1995 | Staniec |
| 5,609,798 A | | 3/1997 | Liu et al. |
| 5,806,630 A | | 9/1998 | Bernal |
| 6,086,052 A | | 7/2000 | Rowe |
| 6,122,808 A | * | 9/2000 | Popp ............................. 29/49 |
| 6,199,465 B1 | * | 3/2001 | Hattori ...................... 184/55.1 |
| 6,230,843 B1 | * | 5/2001 | Geiss ........................ 184/55.2 |
| 6,287,058 B1 | * | 9/2001 | Arai et al. .................... 409/132 |
| 6,582,167 B1 | * | 6/2003 | Kobayashi et al. |
| 6,659,370 B1 | * | 12/2003 | Inoue ......................... 239/423 |

FOREIGN PATENT DOCUMENTS

| | | | | |
|---|---|---|---|---|
| DE | 3429965 A1 | * | 3/1985 | ........... B24B/55/02 |
| DE | 195 19 885 | | 12/1996 | |
| EP | 0 458 632 | | 11/1991 | |
| EP | 0 539 055 | | 4/1993 | |
| EP | 0 941 769 | | 9/1999 | |
| EP | 1 106 902 | | 6/2001 | |
| FR | 1 152 856 | | 2/1958 | |
| FR | 2 670 138 | | 6/1992 | |
| GB | 465357 | | 5/1937 | |
| JP | 25-3045 | | 9/1950 | |
| JP | 53-53124 | | 5/1978 | |
| JP | 54-6762 | | 1/1979 | |
| JP | 55-2487 | | 1/1980 | |
| JP | 62-65147 | | 4/1987 | |
| JP | 63-214131 | | 9/1988 | |
| JP | 2-122873 | | 5/1990 | |
| JP | 5-92596 | | 4/1993 | |
| JP | 5-99398 | | 4/1993 | |
| JP | 5-45393 | | 6/1993 | |
| JP | 6-58491 | | 3/1994 | |
| JP | 6-129594 | | 5/1994 | |
| JP | 6-174190 | | 6/1994 | |
| JP | 6-193795 | | 7/1994 | |
| JP | 7-110100 | | 4/1995 | |
| JP | 9-159610 | | 6/1997 | |
| JP | 9-248735 | | 9/1997 | |
| WO | 93/01891 | | 2/1993 | |
| WO | 00/09937 | | 2/2000 | |

* cited by examiner

*Primary Examiner*—Dana Ross
(74) *Attorney, Agent, or Firm*—Jordan and Hamburg LLP

(57) ABSTRACT

A cutting-oil coater that prevents oil spray from liquefying during conveying and improves the efficiency of work such as oil-refilling by forming a spray feed portion and an oil storage portion separately from each other and making it possible to adjust the arrangement position. A cutting-oil coater includes a spray feed portion, an oil storage portion, an oil feed means for feeding oil to the oil spray feed portion, and a spray conveying passage for conveying the oil spray inside the spray feed portion to the outside of the spray feed portion, wherein the spray feed portion and the oil storage portion are formed separately from each other and can be arranged in different positions respectively, and the arrangement can be adjusted. Thus, the spray feed portion is arranged in the vicinity of the cutting position of a machining tool and the fluid feed unit 11 is arranged at a place where a worker can carry out a work such as oil-refilling. Thus, it is possible both to prevent the oil spray from liquefying during conveying and to improve the efficiency of work such as oil-refilling.

6 Claims, 6 Drawing Sheets

CUTTING-OIL COATER AND CUTTING DEVICE

BACKGROUND OF THE INVENTION

1. Field of the Invention

The present invention relates to a cutting-oil coater for applying cutting-oil to a workpiece or a tool during cutting and a cutting device.

2. Description of the Prior Art

Hitherto, cutting-oil has been applied to a target object, a tool, or the like in order to improve machining accuracy and to extend tool life. When applying oil in a state of droplet, cutting can be carried out with only a necessity minimum amount of oil, thus not only improving machining accuracy and productivity, but also leading to improving a working environment and the simplification of a plant and equipment.

FIG. 6 is a view showing the configuration of one example of a conventional cutting-oil coater. Reference numeral 50 denotes a spray feed device for feeding an oil spray (liquid fine particles of oil). The spray conveying device includes a container 51 forming a main body. The container 51 is provided with a spray discharge nozzle 52, an air discharge nozzle 53, a spray conveying pipe 54 and an oil feed port 55. The air discharge nozzle 53, which is used to feed the container 51 with air, is connected to a gas source 56. The flow rate of the discharged air can be regulated by an air flow rate regulating valve 58b.

The spray conveying pipe 54 is used to convey oil spray inside the container 51 to the outside of the container 51. The oil spray is injected into the container 51 from a nozzle tip portion 52c of the spray discharge nozzle 52. The spray discharge nozzle 52 has a dual structure formed of a gas tube 52a and an oil tube 52b that extends inside the gas tube 52a. The gas tube 52a is connected to a gas source 56. The flow rate of discharging gas can be regulated by a gas flow rate regulating valve 58a. The oil tube 52b is connected to an oil pump 57. The flow rate of oil from the pump 57 can be regulated by an oil flow rate regulating valve 59.

At the nozzle tip 52c, oil fed from the oil pump 57 and gas fed from the gas source 57 are mixed with each other, and thus oil spray is produced and injected into the container 51. The air pressure from the spray discharge nozzle 52 is applied to the inside of the container 51, so that fine oil spray residing in the container 51 is affected by the pressure applied and is conveyed to the spray conveying pipe 54. Furthermore, the gas discharged from the air discharge nozzle 53 can increase the internal pressure in the container 51.

The oil spray passing through the spray conveying passage 54 finally is discharged from a tip 63 having a narrower diameter. Thereby, the flow velocity of the oil spray increases, and the oil spray is discharged in a state in which it is liquefied in a state of an oil droplet so that it can be attached to a workpiece. This discharged flow can be used as a lubricant in cutting.

The oil 62 inside the container 51 flows into the pump 57 via the oil feed port 55 and is used for producing oil spray. The oil 62 also includes the oil that has dropped inside the container 51 and has not flowed into the conveying passage 54. The container 51 also serves as an oil storage portion. Oil can be refilled into the container from an oil feed port 61 by uncapping an oil-refilling cap 60.

However, the above-mentioned conventional cutting-oil coater has following problems. As mentioned above, the container 51 serves as an oil storage portion, and the oil pump 57 and various regulating valves are also arranged together with the container 51. When such a device is attached to a machining tool, to take the convenience in oil-refilling or regulation of the flow rate into account, such a device is attached to, for example, a side of the machining tool that faces an aisle. Thereby, in general, the distance between the oil coater main body and a position for cutting is increased, and thus the total length of the conveying passage 54 also is increased.

In this case, since the conveying passage 54 is provided in accordance with the shapes of the various portions of the machining tool, the conveying passage 54 has a large number of bend portions between the container 51 and the discharge portion 63. The presence of the bend portions causes turbulence in the oil spray during conveying. As a result, a part of fine oil spray is liquefied. Such a liquefaction of the oil spray may cause clogging in the conveying passage 54, thus preventing the conveying of the oil spray.

One of the measures taken for solving such problems may be to take a specification of the shapes of the various portions at the side of the machining tool so that the bend portions in the conveying passage 54 are reduced. In this case, the specification of the machine tool is limited as well as the machining tool becoming larger. Furthermore, space for providing the machining tool has to be increased, which is not realistic.

Furthermore, if the coater itself is provided in the vicinity of cutting portion, the above-mentioned problem is solved. However, in this case, the oil supply becomes inconvenient and the regulation of the device or checking of operation becomes inconvenient. For example, when the coater is provided at a high place in the large size machining tool, work such as an oil supply becomes extremely difficult.

SUMMARY OF THE INVENTION

With the foregoing in mind, it is an object of the present invention to provide a cutting-oil coater capable of preventing the liquefaction of oil spray during conveying and improving the efficiency of work, for example, oil-refilling, etc. by forming a spray feed portion and an oil storage portion separately and enabling the arrangement position thereof to be regulated.

In order to achieve the above-mentioned object, a cutting-oil coater of the present invention includes a spray feed portion, an oil storage portion for storing oil to generate spray, an oil feed means for feeding oil in the oil storage portion to the oil spray feed portion, and a spray conveying passage for conveying the oil spray inside the spray feed portion to the outside of the spray feed portion, wherein the spray feed portion and the oil storage portion are formed separately from each other and can be remote arranged in different positions respectively, and the arrangement position can be adjusted. With such a cutting-oil coater, since the spray feed portion can be attached in the vicinity of the cutting portion and the oil storage portion can be disposed in a place where an oil-refilling work can easily be carried out, it is possible both to prevent liquefaction of the oil spray during conveying and to improve the efficiency of work such as an oil-refilling.

It is preferable that the above-mentioned cutting-oil coater further includes a return passage for allowing the oil in the spray feed portion to return to the oil storage portion. With such a cutting oil coater, oil can be reused.

Furthermore, it is preferable that the pressure inside the spray feed portion is higher than the pressure inside the oil storage portion, and the oil inside the return passage is conveyed to the oil storage portion due to the difference between the pressure inside the spray feed portion and the pressure inside the oil storage portion. With such a cutting-oil coater, since it is not necessary to use an oil pump etc. for conveying a returning oil and it is not necessary to use the gravity drop for return of oil, the degree of freedom in the arrangement of the return passage is enhanced.

Furthermore, it is preferable that an inlet of the return passage in the spray feed portion is an orifice with a narrower diameter with respect to the return passage. With such a preferred cutting-oil coater, it is possible to reduce the gas flow rate inside the spray feed portion while conveying oil to the oil storage portion.

It is preferable that the inlet of the return passage has a narrower diameter portion whose cross-sectional area is in the range from 0.05 mm$^2$ to 0.15 mm$^2$. With such a cutting-oil coater it is possible to prevent the gas in the spray feed portion from flowing into the return passage while conveying oil to the oil storage portion.

Furthermore, it is preferable that a cross-sectional area of the inlet of the return passage is variable. With such a cutting-oil coater, since it is possible to regulate the cross-sectional area of the inlet of the return passage in accordance with the internal pressure of the spray feed portion, for example, in a case where the internal pressure of the spray feed portion is increased, it is possible to suppress the gas from flowing into the inlet by reducing the cross-sectional area of the inlet.

Next, a cutting device of the present invention includes the above-mentioned cutting oil coater. With such a cutting device, since the spray feed portion can be attached in the vicinity of the cutting portion and the oil storage portion can be disposed in a place where an oil-refilling work can easily be carried out, it is possible both to prevent liquefaction of the oil spray during conveying and to improve the efficiency of work such as an oil-refilling.

DESCRIPTION OF THE PREFERRED EMBODIMENTS

Hereinafter, one embodiment of the present invention will be explained with reference to the accompanying drawings.

Figure 1:
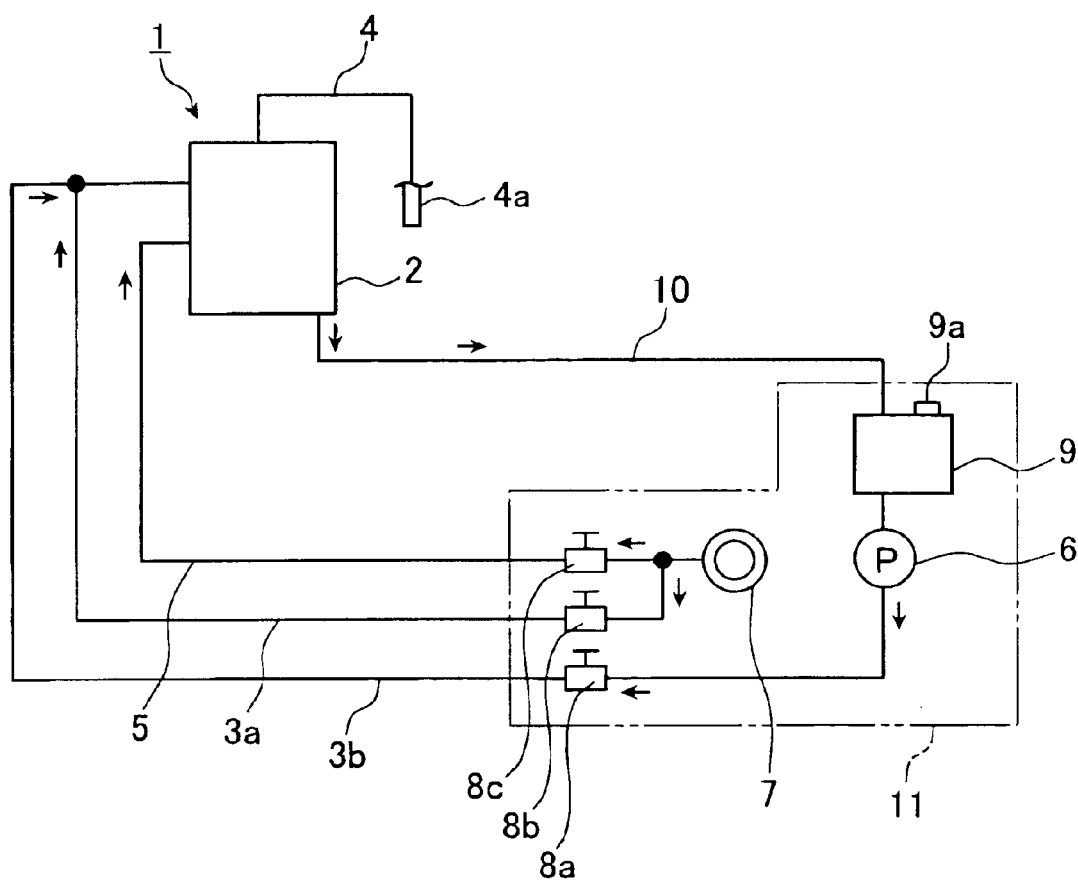
FIG. 1 is a view showing a configuration of a cutting-oil coater according to one embodiment of the present invention.
Figure 2:
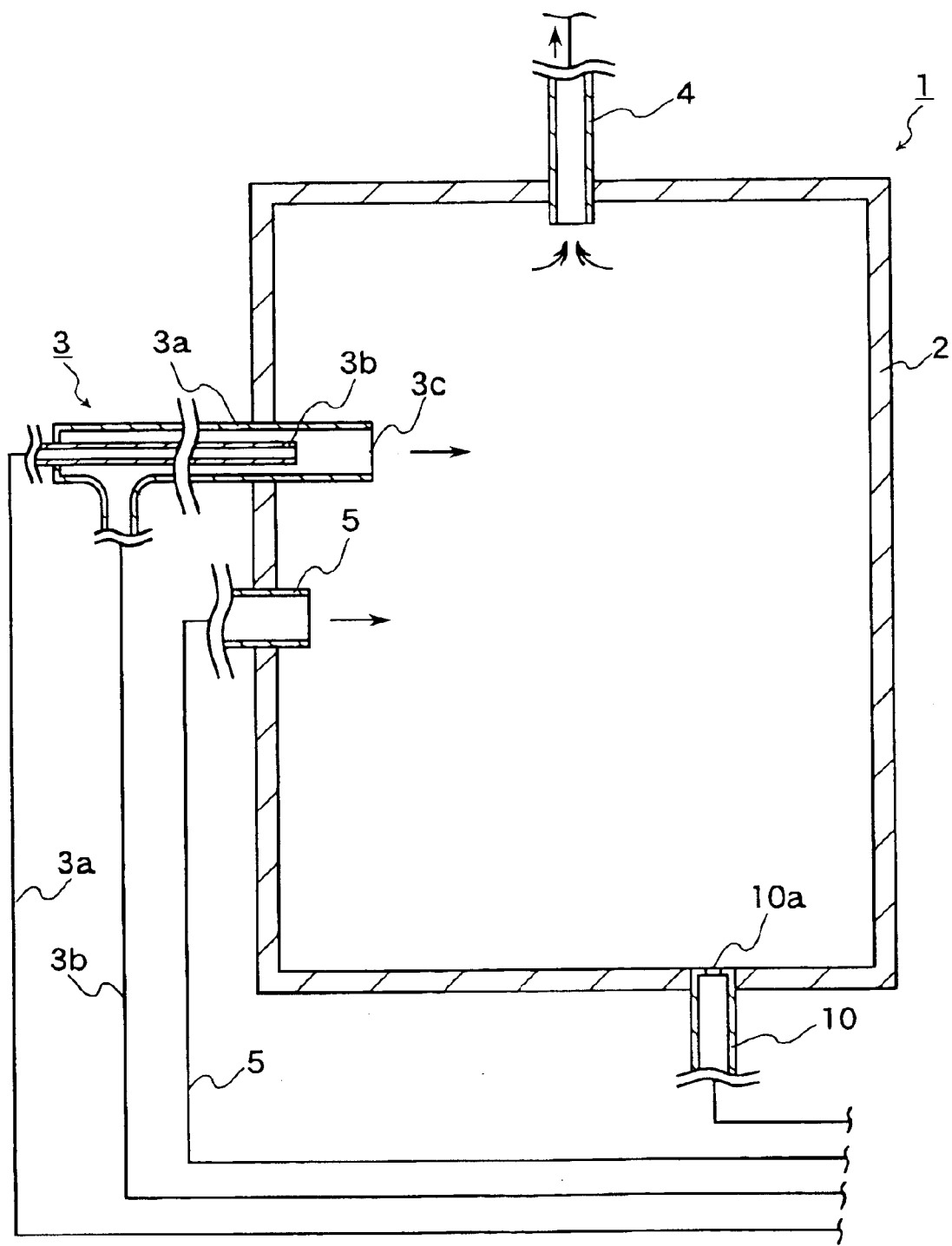
FIG. 2 is a cross-sectional view showing a detail of a spray feed portion according to one embodiment of the present invention.

FIG. 1 is a view showing a configuration of a cutting-oil coater according to a first embodiment of the present invention; and FIG. 2 is a cross-sectional view showing a detail of the spray feed portion 1 shown in FIG. 1.

The particle size of the oil spray fed from a spray discharge pipe 3 has a variation ranging from fine to large. In the container 2, most of the larger diameter oil spray or oil droplets drop by gravity, and some of them are attached to the inner wall of the container 2 and then move to a lower part in the container 2. Hereinafter, fine oil spray denotes oil spray capable of drifting in the air in the form of fume.

The gas pressure from the spray discharge pipe 3 is applied to the inside of the container 2, so that fine oil spray residing in the container 2 is affected by the pressure applied and conveyed to the inside of a spray conveying passage 4.

The oil spray passing through the spray conveying passage 4 finally is discharged into the atmosphere from a tip 4a having a narrower diameter. The flow velocity of the oil spray is increased at the tip 4a, and the oil spray is changed to the state of an oil droplet so that it can be attached to a work piece. This discharging flow can be used as a lubricant for cutting.

In general, the tip 4a corresponds to, for example, a tip of a drill, etc. When the diameter of the tip 4a is increased by exchanging tools, it may be impossible to secure the flow velocity necessary for forming the oil spray into oil droplets at the tip portion 4a. In this case, by increasing the internal pressure inside the container 2 by the use of the gas from a gas discharging pipe 5, it is possible to secure the flow velocity necessary for forming the oil spray into oil droplets.

Oil spray fed from the spray discharge pipe 3 is generated by mixing oil and gas such as air. FIG. 2 shows an example in which oil spray is generated by the dual pipe structure. In this example, oil from an oil tube 3b and gas from a gas tube 3a are mixed with each other, and thus oil spray is generated.

As shown in FIG. 1, the oil tube 3b is connected to an oil supply pump 6 that is an oil feeding means. The gas tube 3a is connected to a gas source 7. The amount of oil supplied and the amount of gas supplied can be regulated by an oil flow rate regulating valve 8a and a gas flow rate regulating valve 8b, both of which are flow rate regulating means, respectively. Furthermore, a gas discharge pipe 5 is connected to a gas source 7 and the amount of gas supplied can be regulated by a gas flow rate regulating valve 8c that is a flow rate regulating means.

The oil supply pump 6 is connected to an oil tank 9 that is an oil storage portion. Oil flows into the oil supply pump 6 from the oil tank 9. Furthermore, the oil tank 9 is connected to the container 2 via an oil return passage 10. Therefore, the oil, which has been screened in the container 2 and does not flow into the spray conveying passage 4, is conveyed to the oil supply pump 6 via the oil tank 9 and reused as oil for generating oil spray. Furthermore, the oil can be refilled into the oil tank 9 by uncapping a refilling cap 9a of the oil tank 9 and filling oil through the opening.

A fluid feed unit 11 including the oil tank 9 surrounded by a double-dot chain line, the oil supply pump 6 and the gas source 7 is formed separately from the oil feed portion 1. Therefore, the fluid feed unit 11 can be provided in a different position remote from the spray feed portion 1. Even if the distance between the spray feed portion 1 and the fluid feed unit 11 is increased, it is possible to correspond to the increase by increasing the length of each passage connecting the spray feed portion 1 and the fluid feed unit 11. Therefore, according to this embodiment, it is possible to adjust the arrangement position of each portion, and for example, the spray feed portion 1 can be arranged in the vicinity of a cutting position of a machining tool and the fluid feed unit 11 can be arranged at the side of the machining tool that faces an aisle.

With such an arrangement, since the distance between the spray feed portion 1 and the cutting position is short, the spray conveying passage 4 is not required to be arranged in accordance with the shape of the each portion of the machining tool and to remove bend portions. In other words, it is also possible to arrange the spray conveying passage 4 substantially linearly. Consequently, the oil spray can be conveyed to the cutting position with the state of fine oil spray kept.

Furthermore, even if the spray conveying passage 4 cannot be arranged linearly, since the distance between the spray feed portion 1 and the cutting position is short, the number of bend portions in the spray conveying passage 4 can be reduced. As a result, it is possible to suppress the generation of turbulence that causes oil spray to assume the state of oil droplets.

Furthermore, in this case, since the fluid feed unit 11 is arranged at the side of the machining tool that faces an aisle, it is not necessary for a worker to go to a place of the spray feed portion 1 for carrying out oil-refilling and regulating the amount of oil and gas supplied. Thus, operations such as an oil-refilling can be carried out easily.

Furthermore, with such an arrangement, the distance between the spray feed portion 1 and the cutting position becomes short. On the contrary, the distance between the spray feed portion 1 and the fluid feed unit 11 becomes longer, and the distance of the oil conveying passages 3b, 10 and the gas flow passage 3a, 5 becomes longer, thus necessitating bend portions in accordance with the shape of respective portions of the machining tool. However, these passages convey oil or gas as a single substance, and therefore even if they involve long distance or bend portions, there are no particular problems in feeding oil and gas and there are no effects on the change in the particle of oil spray in the spray conveying passage 4.

Figure 3:
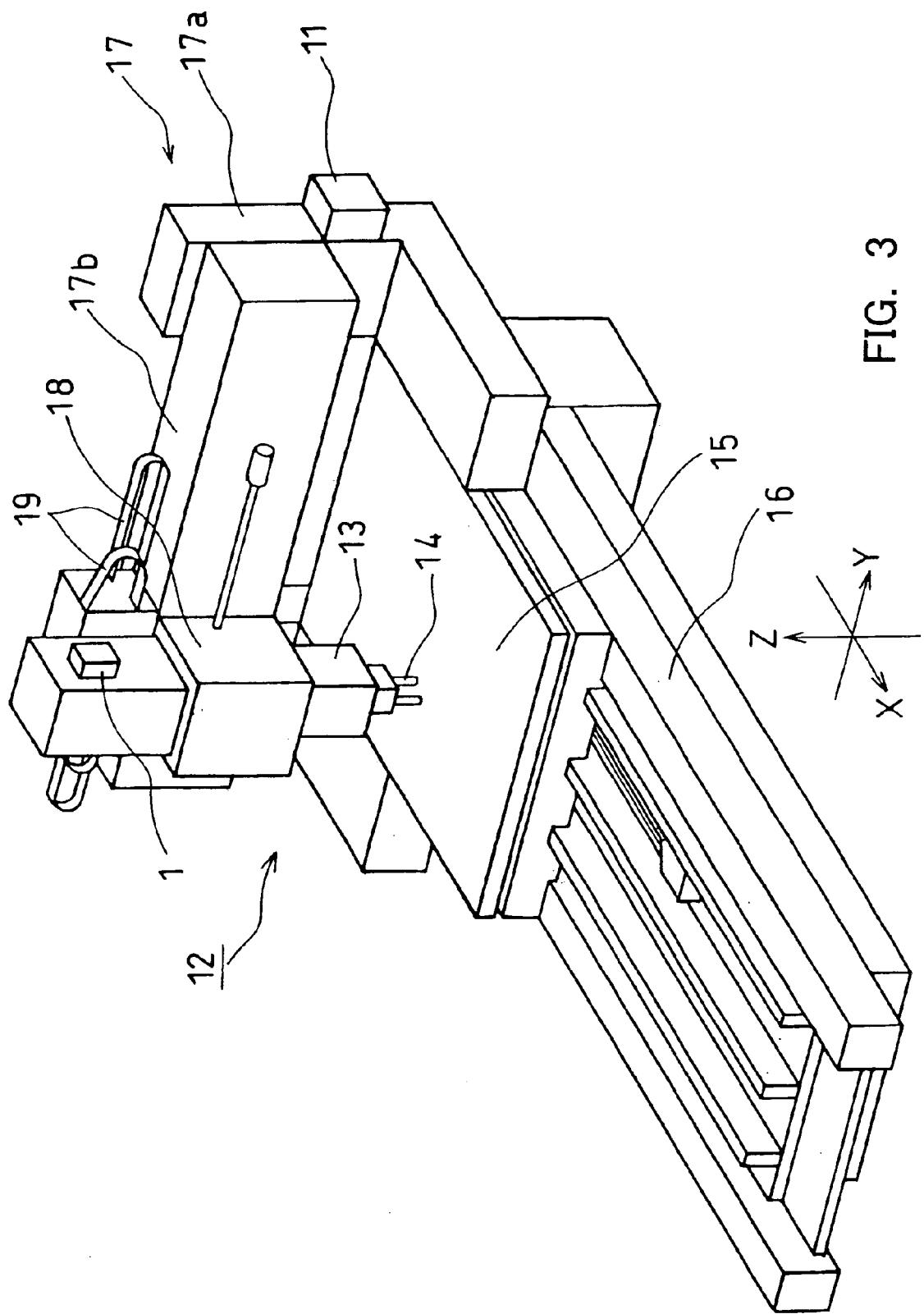
FIG. 3 is a perspective view showing a state in which a cutting-oil coater is placed in a machining tool according to one embodiment of the present invention.

FIG. 3 is a perspective view showing a state in which a cutting-oil coater is placed in a machining tool, which is a cutting device, according to one embodiment of the present invention. The machining tool 12 shown in this drawing uses a machining center. Inside a head 13, a spindle is built-in. During cutting, the spindle revolves at high speed, so that a tool 14 such as a drill, etc. that is attached to the tip of the spindle carries out cutting of a workpiece (not shown in the drawing).

A table 15 is arranged on a support base 16 and can move in the direction shown by an arrow X. The support 17 has a vertical portion 17a and a horizontal portion 17b. The horizontal portion 17b is provided with a head support 18. In accordance with the movement of the vertical portion 17a in the direction shown by an arrow X, the movement of the horizontal portion 17b of the head supporting portion 18 in the direction shown by an arrow Y and the movement of the horizontal portion 17b in the direction shown by an arrow Z, the head 13 can move in the directions shown by arrows X, Y and Z.

The spray feed portion 1 is attached to the upper part of a head support 18. The spray conveying passage 4 from the spray feed portion 1 is connected to the spindle in the head 13 via the head support 18. Therefore, the oil spray from the spray conveying passage 4 passes through a through hole inside the spindle. The spindle is provided with, for example, a drill (a tool 14) having a through hole with a narrower diameter than that of the spindle. Thus, the oil spray passing through the through hole of the spindle flows into the through hole of the drill. The flow velocity of the oil spray is increased by passing through the through hole having a narrower diameter, and the oil spray, which is changed into oil droplets so that they can be attached to a workpiece and a tool, is discharged.

In this embodiment, since the spray feed portion 1 is attached to the upper part of the head support 18, the distance between the spray feed portion 1 and the spindle is short. Therefore, it is possible to prevent the oil spray from liquefying in the midway of the flow passage. Fine oil spray from the spray feed portion 1 can flow into the spindle with the state of fine oil spray maintained. Therefore, it is possible to prevent liquid from being attached to a wall surface of the through hole in the spindle revolving at high speed, thus preventing clogging of the through hole.

Furthermore, in this embodiment, the fluid feed unit 11 including the oil tank 9, etc. is attached to the side face of the vertical portion 17a of the supporting portion 17. A flow passage connecting the spray feed portion 1 and the fluid feed unit 11 exists inside the supporting portion 17 and a pleated portion (a bendable or flexible portion) 19. In the pleated portion 19, electric wiring is arranged, and thus the pleated portion 19 also protects this electric wiring.

A portion where the fluid feed unit 11 is attached corresponds to the side that faces an aisle. Therefore, oil-refilling and regulation of each flow rate can be carried out easily. It is not necessary for a worker to go to the upper portion of the head support to which the spray feed portion 1 is attached. By using the device according to this embodiment like this, it is possible to prevent the oil spray from liquefying during conveying and to improve the efficiency of work such as an oil-refilling, etc.

Furthermore, in this embodiment, as mentioned above, the spray feed portion 1 and the oil tank 9 are connected to each other by the oil return passage 10 to reuse oil (FIGS. 1 and 2).

As shown in FIG. 2, an inlet port 10a to an oil return passage 10 is arranged in the bottom portion of the container 1. This inlet port 10a has a narrower diameter as compared with the inner diameter of the return passage 10 and has an orifice (an aperture having a length relatively shorter than the size of the cross section) shape. The reason why the diameter of the inlet port 10a is narrow like this is to reduce the flow rate of gas in the container 1 while conveying oil. In FIG. 2, a case where the inlet port 10a is formed into one unit with the return passage 10 is shown, however, the configuration is not limited to this alone, and a cylindrical member having a through hole may be fit into the return passage 10 and the through hole may be used as an inlet port.

In this embodiment, the oil tank 9 shown in FIG. 1 has an open portion (not shown in the drawing) and the pressure inside the oil tank 9 is equal to the atmospheric pressure. Furthermore, as mentioned above, since the oil spray is finally discharged from the tip portion 4a into the atmosphere, the pressure inside the container 2 is set to a value that is higher than the atmospheric pressure. Therefore, oil inside the return passage 10 is conveyed to the oil tank 9 due to the difference in pressure between the container 1 and the oil tank 9. Therefore, since it is not necessary to use an oil pump, etc. and it is not necessary to particularly use the gravity drop for return of oil, the degree of freedom in the arrangement of the return passage 10 is increased.

Specifically, the internal pressure of the container 1 is preferably 0.15 to 0.4 MPa in use. When the internal pressure is in the above-mentioned range, it is possible to discharge oil spray in a state of an oil droplet into the atmosphere. In this case, it is preferable that a cross sectional area of the inlet port 10a on the bottom portion of the container 1 includes a portion whose cross-sectional area is 0.15 mm² or less. Furthermore, when the fluidity of oil is taken into account, the cross-sectional area is preferably 0.05 mm² or more. When the cross sectional area is in such a range, it is possible to prevent the reduction of gas flow rate in the container 1 and to prevent the reduction of the internal pressure 1 in the container. The cross-sectional area herein denotes an effective area of the portion for allowing the fluid to pass through.

When a large amount of gas inside the container 1 flows into the oil return passage 10, the internal pressure in the container 1 is reduced as well as oil being changed into oil spray inside the oil return passage 10, and this oil spray is blown out from the open portion of the oil tank 9, which is not preferable for the working environment.

(Second Embodiment)

Figure 4:
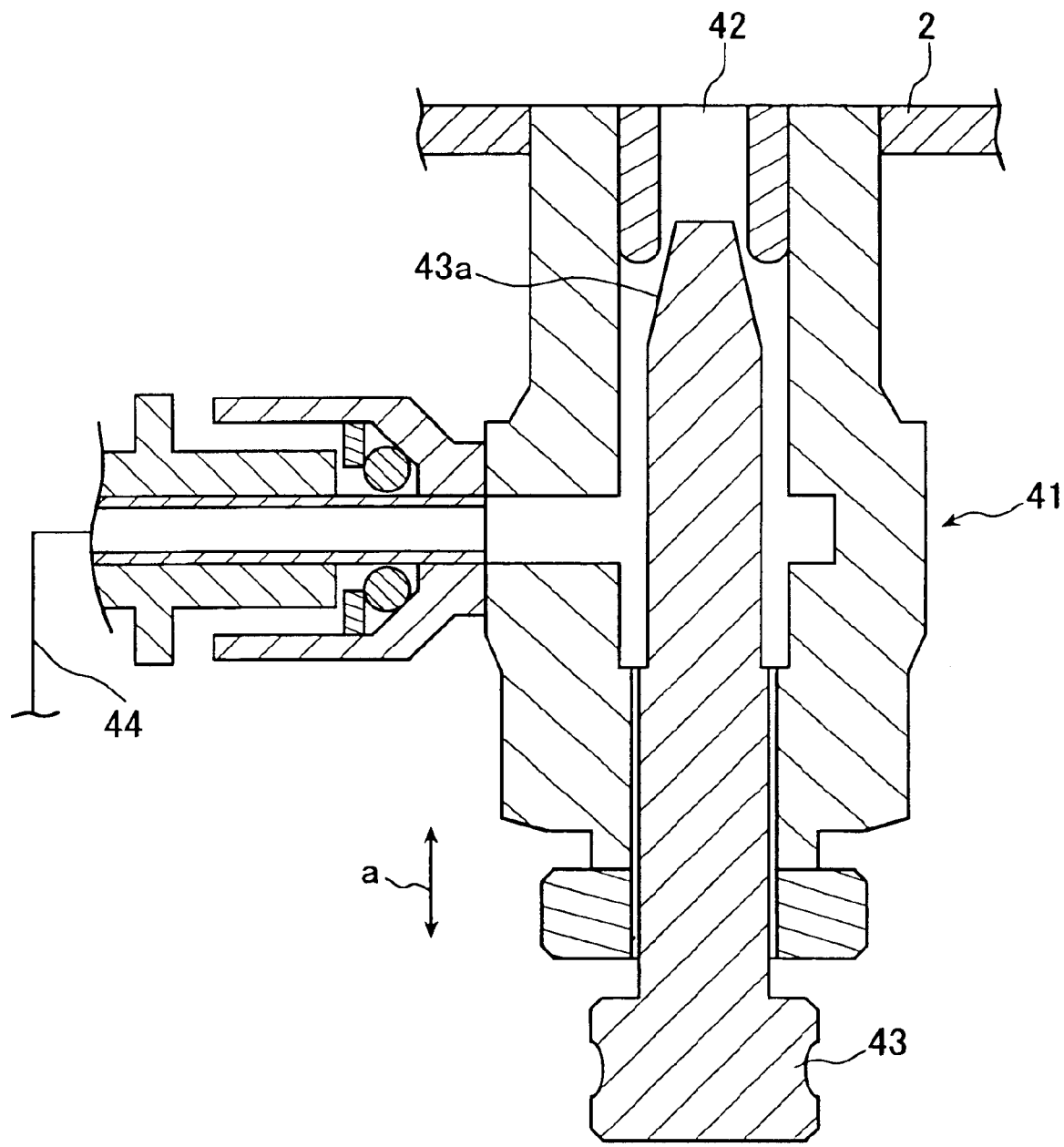
FIG. 4 is a view showing a variable narrowing portion of a cutting-oil coater according to another embodiment of the present invention.

In the second embodiment, a cross-sectional area of the portion that corresponds to the inlet port 10a of the oil return passage 10 in the first embodiment is variable. In this embodiment, a variable narrowing portion is attached to the bottom portion of the container 2. The main part thereof is shown in FIG. 4.

The variable narrowing portion 41 is attached to the bottom portion of the container 2 and oil flows into the container 2 from the inlet port 42. The oil flowing into the variable narrowing portion 41 is conveyed to the inside of the oil tank via the oil return passage 44. In the inlet port 42, a tapering portion 43a of a needle 43 is located, thereby narrowing the diameter of the inlet port 42.

The revolution around the axis of the needle 43 allows the needle 43 to be displaced vertically and horizontally (in the direction shown by "a") and the position of the taper portion 43a also to be displaced. Thus, the narrowing state of the inlet port 42 by the tapering portion 43a also is changed. The cross-sectional area of the portion where the fluid can pass through the inlet port 42 is changed at the tapering portion 43a.

By providing the variable narrowing portion 41 like this, the cross-sectional area of the inlet port 42 can be regulated in accordance with the internal pressure in the container 2. For example, when the internal pressure in the container 2 is increased, by reducing the cross sectional area of the inlet port 42, the reduction of gas flow rate inside the container 2 can be suppressed.

(Third Embodiment)

Figure 5A:
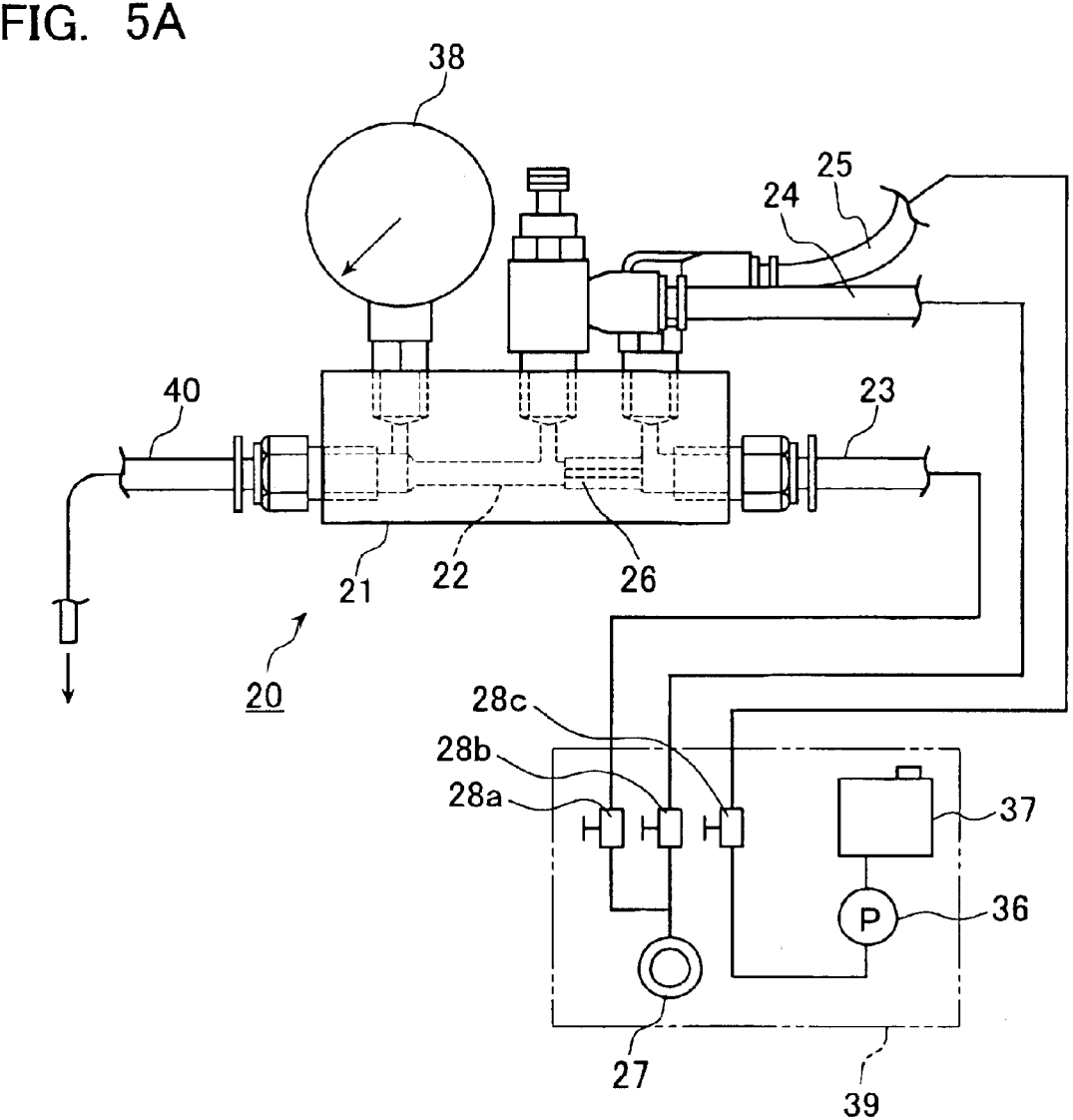
FIG. 5A is a view showing a configuration of a cutting-oil coater using another spray feed portion according to the first embodiment of the present invention.
Figure 5B:
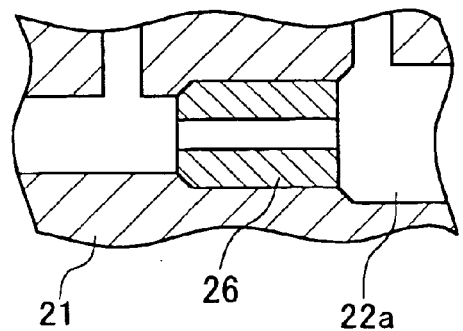
FIG. 5B is an enlarged cross-sectional view showing a vicinity of the flow passage of the spray feed portion main body according to another embodiment of the present invention.
Figure 6:
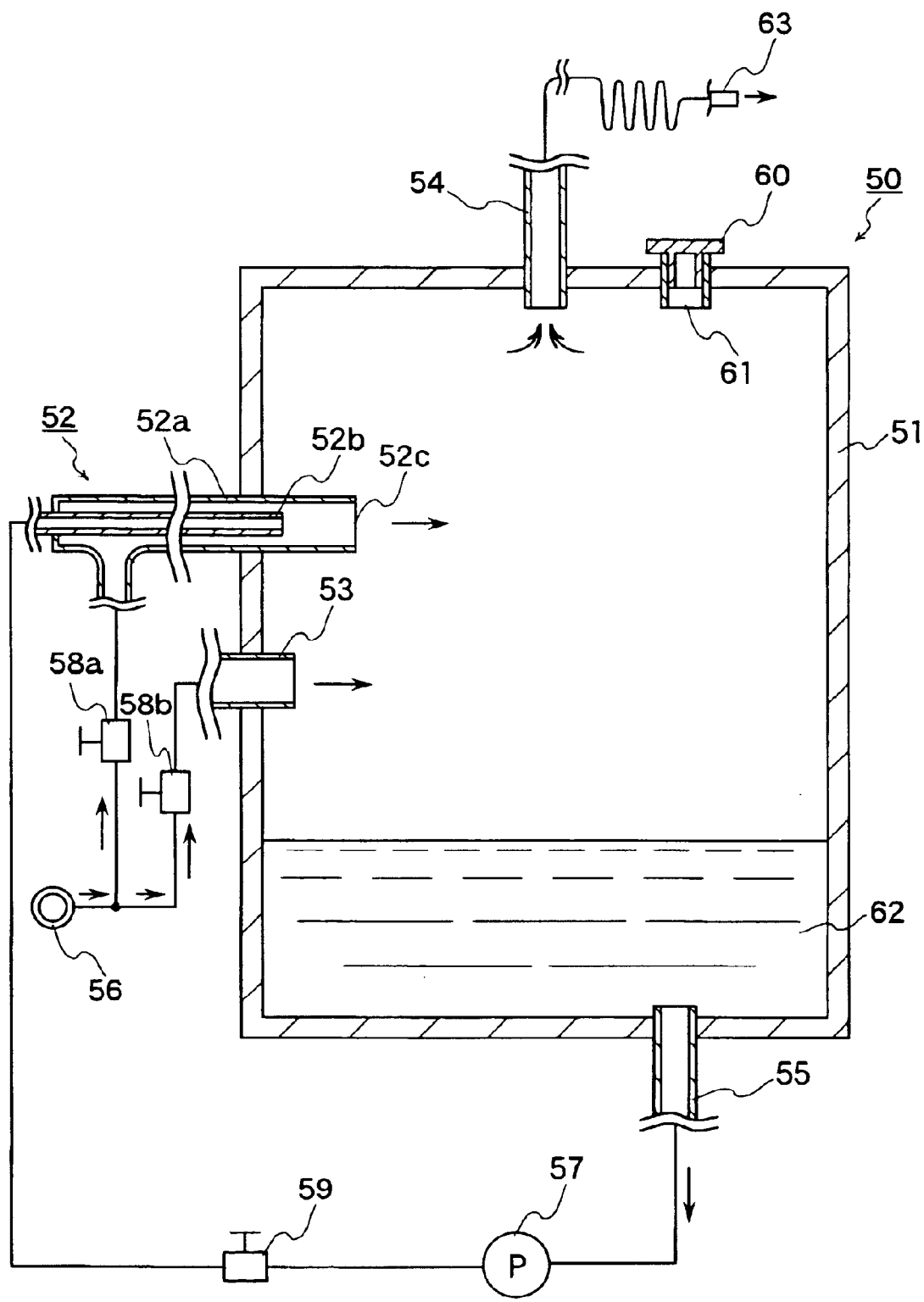
FIG. 6 is a view showing a configuration of a conventional cutting-oil coater.

FIG. 5A is a view showing a configuration of a cutting-oil coater using another spray feed portion according to the first embodiment of the present invention; and FIG. 5B is an enlarged cross-sectional view showing a vicinity of the flow passage 22 of the spray feed portion main body 21. The flow passage 22 is formed inside the spray feed portion main body 21 of the spray feed portion 20. Gas such as an air from a gas pipe 23 for generating spray, a gas pipe 24 and oil from an oil pipe 25 flow into the flow passage 22. As shown in FIG. 5B, the spray generating portion 26 has an inner diameter that is narrower than that of the flow passage 22a, and thus the flow velocity of oil and gas is increased. In the spray generating portion 26, a gas from the gas pipe 23 for generating spray and an oil from the oil pipe 25 are mixed, and thereby the oil spray is produced.

The gas in the gas pipe 23 for generating spray and the gas pipe 24 are fed from the gas source 27 and the amount to be conveyed in respective pipes can be regulated by the regulating valves 28a and 28b that are air regulating means. The oil inside the oil pipe 25 is fed by the oil pump 36 into which the oil flows from an oil tank 37. The flow rate of oil in the oil pipe 25 can be regulated by the regulating valve 28c that is an oil regulating means.

It is possible to regulate the amount of oil spray or particle diameter of oil spray by regulating the flow rate in the air pipe 23 for generating spray and the flow rate of oil inside the oil pipe 25. Furthermore, it is possible to regulate the pressure at the final outlet portion of the oil spray by regulating the flow rate in the air pipe 24. Reference numeral 38 denotes a manometer for detecting the pressure of the oil spray.

The spray feed portion 20 of the third embodiment does not have a particle size screening function as in the first embodiment. However, since a container and an oil returning passage are not needed, the device has an advantageous, for example, miniaturization of the device or a low cost. The oil spray generated at the spray feed portion 20 has much distribution in particle size as compared with the oil spray in the first embodiment. However, also in this embodiment, it is preferable that the oil spray is prevented from being liquefied while conveying. It is preferable that the oil spray is conveyed to the final outlet portion with a state in which it is generated at the spray feed portion 20 kept.

Also in this embodiment, since a spray feed portion 20 is formed separately from the liquid feed unit 39 surrounded by a double-dot chain line, it is possible to attach the spray feed portion 20 in the vicinity of the cutting portion and to attach a fluid feed unit 39 at the side that faces an aisle, etc. where oil-refilling work and regulation work can easily be carried out. Therefore, as in the first embodiment, the distance between the spray feed portion and the cutting position can be shortened. As a result, it is possible to prevent clogging of the spray conveying passage 40 due to the liquefaction of oil spray during conveying.

Furthermore, in this case, as in the first embodiment, since the feed portion is arranged at the side of a machining tool that faces an aisle, it is not necessary for a worker to go to the spray feed portion 20 for oil-refilling or regulating the feed amount of oil or gas. Thus, it is possible to carry out the work such as oil-refilling, etc. easily. In other words, also in this embodiment, it is possible both to prevent liquefaction of the oil spray during conveying and to improve the efficiency of work such as oil-refilling.

In each of the above-mentioned embodiments, at least a spray feed portion may be arranged in the vicinity of the cutting portion independently. All components of the fluid feed unit are not necessary to be arranged in the same place. For example, if the spray feed portion and the oil storage portion can be arranged separately, it is possible both to prevent the liquefaction of the oil spray during the conveying and to improve the efficiency of work such as oil-refilling. Therefore, each component of the fluid feed unit may be appropriately determined so that the operation of each part and efficiency are improved. For example, the oil feed portion and the regulating valve may be appropriately arranged in the different places.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A cutting-oil coater for application of cutting oil to a cutting device comprising
   - a spray feed portion,
   - an oil storage portion for storing oil for generating spray,
   - an oil feed means for feeding oil inside the oil storage portion to the oil spray feed portion,
   - means for forming an oil spray by actively mixing said oil and a gas under pressure
   - A spray conveying passage for conveying the oil spray inside the spray feed portion to the outside of the spray feed portion, and
   - a return passage for allowing the oil inside the spray feed portion to return to the oil storage portion and designed to receive continuously substantially all the oil which separates from said spray before the spray is ejected onto said cutting device
   - wherein the spray feed portion and the oil storage portion are formed separately from each other and can be remotely arranged in different positions respectively, and the relative arrangement position of the spray feed portion and the oil storage portion can be adjusted.

2. The cutting-oil coater according to claim 1, wherein the pressure inside the spray feed portion is higher than the pressure inside the oil storage portion, and the oil inside the return passage is conveyed to the oil storage portion due to the difference between the pressure inside the spray feed portion and the pressure inside the oil storage portion.

3. The cutting-oil coater according to claim 1, wherein an inlet of said return passage in the spray feed portion is an orifice with a narrower diameter than the inner diameter of the return passage.

4. The cutting-oil coater according to claim 1, wherein the inlet of said return passage has a diameter portion whose cross-sectional area is in the range from 0.05 $mm^2$ to 0.15 $mm^2$ and is narrower than that of the inner diameter of the return passage.

5. The cutting-oil coater according to claim 1, wherein the cross-sectional area of the inlet of the return passage is variable.

6. A cutting device comprising a cutting oil coater according to claim 1.

* * * * *